United States Patent [19]

Chu

[11] Patent Number: 4,704,207
[45] Date of Patent: Nov. 3, 1987

[54] FILTER CARTRIDGE INCLUDING EXTERNAL CELL SEPARATORS

[75] Inventor: Chaokang Chu, W. Hartford, Conn.

[73] Assignee: Cuno Incorporated, Meriden, Conn.

[21] Appl. No.: 803,819

[22] Filed: Dec. 2, 1985

[51] Int. Cl.⁴ .............................................. B01D 29/34
[52] U.S. Cl. .................................... 210/347; 210/486; 210/488
[58] Field of Search ............... 210/314, 317, 340, 341, 210/346, 347, 483, 486, 488

[56] References Cited

U.S. PATENT DOCUMENTS

| | | | |
|---|---|---|---|
| 1,102,685 | 2/1914 | Proper | 210/350 |
| 1,742,919 | 1/1930 | Manning | 210/439 |
| 2,411,341 | 11/1946 | Shepard | 210/437 |
| 2,444,147 | 6/1948 | Walton | 210/486 |
| 2,591,056 | 4/1952 | Ericson | 210/486 |
| 2,787,333 | 4/1957 | Boone et al. | 210/486 |
| 2,813,632 | 11/1957 | Muller | 210/486 |
| 2,844,255 | 7/1958 | Cavenah et al. | 210/486 |
| 2,966,269 | 12/1960 | Allen | 210/335 |
| 3,019,905 | 2/1962 | Baker et al. | 210/486 |
| 3,048,276 | 8/1962 | Darnell | 210/488 |
| 3,079,001 | 2/1963 | May | 210/488 |
| 3,165,471 | 1/1965 | Hencken | 210/488 |
| 3,178,028 | 4/1965 | Charnock et al. | 210/487 |
| 3,537,592 | 11/1970 | Ogden et al. | 210/486 |
| 3,666,107 | 5/1972 | Boggs et al. | 210/488 |
| 4,048,073 | 9/1977 | Rose | 210/484 |
| 4,094,793 | 6/1978 | Patzig | 210/488 |
| 4,221,663 | 9/1980 | Little | 210/486 |
| 4,347,208 | 8/1982 | Southall | 264/D48 |

Primary Examiner—Richard V. Fisher
Assistant Examiner—Wanda L. Millard
Attorney, Agent, or Firm—Michael E. Zall; Edward R. Weingram

[57] ABSTRACT

A depth-type filter cartridge comprises an elongated fluid-conducting core, and a plurality of filter cells mounted generally parallel to one another along the length of the core. Fluid to be filtered passes from the exterior into the interior of the cells through a filter medium, and then from the interior of the cells into the core. Support for the filter cells to prevent distortion or damage when used under extreme conditions is provided by external filter cell separators which coact with the cells and are mounted radially about the core between each pair of adjacent cells.

9 Claims, 4 Drawing Figures

FILTER CARTRIDGE INCLUDING EXTERNAL CELL SEPARATORS

BACKGROUND OF THE INVENTION

1. Field of the Invention

The present invention relates generally to filter cartridges, and in particular to filter cartridges including a plurality of filter cells spaced apart by external cell separators.

2. Description of Related Art

The present invention is an improvement in filter cartridges, and particularly filter cartridges of the depth type, in which a cartridge comprises a plurality of individual filter cells. The cells are mounted about a central hollow core. Openings are formed in the core which communicate with the interiors of the filter cells. Fluid to be filtered flows from the exterior of the cells through the filter media and exits through the core.

Certain depth filter cartridges, such as those sold under the trademark ZETA PLUS by the AMF Cuno Microfiltration Products Division, Meriden, Conn., employ an internal thin perforated polypropylene disc within the cartridge to keep the media separated during use. The disc preferably includes upper and lower ribs of varying thickness to maintain the dished shape of the media and the internal space between them. There also may be a seal ring between two cells and adjacent the core to prevent bypass of non-filtered solution from one cell to each other.

It has been found that when filtering fluids, differential pressure and filter-cake buildup on the filter media can cause distortion of the cell and, in addition, minor swelling that can restrict the flow channel between cells, causing decrease in flow per unit of differential pressure.

The filter cells in such cartridge can also become weakened by heat and distort or even collapse when used to filter hot liquids, for example over about 40° C. Heat may also cause the cell shape to be distorted horizontally, causing contact between the cells or breakage of the seal at all or part of the outer edge of the cell. Also, the media themselves may be broken by heat.

These problems may also occur due to use or handling. If they occur, only part of the media may be effectively used for filtration.

These problems have been found to be non-uniform from cell to cell, because it is difficult to provide perfectly uniform media and internal separators and to assemble these in a consistent fashion.

Further, when filtering certain organic liquids, e.g. hexane, and after sterilization by steam, the media may swell, causing contact between the cells, leading to ineffective use of the filtration area.

Prior art filter structures have not satisfactorily addressed these concerns. For example, U.S. Pat. No. 3,666,107 discloses a filter cartridge comprising a plurality of filter elements each consisting of two dished diaphragm sections of filter material, each section having attached thereto one or more circumferential or radial stiffening members or ribs. Such construction is believed to be difficult to manufacture and would impair to some extent the usable surface area of the filter elements.

A prior art filter cartridge having wafer-like elements but with no additional support therefor is seen in U.S. Pat. No. 2,966,269. This patent discloses a filter assembly including filter cartridges, each constituting a stack of wafers, each wafer being formed from a pair of opposed dished annular discs of filter paper or the like. The discs are secured around their outer peripheral edges, for example by an adhesive, and are spaced apart at their inner peripheral edges by annular spacers between the discs, i.e. within the wafers. The annular spacers have apertures opening into the interior of the wafer. The wafers are stacked together in generally cylindrical form and held together between end plates by tie rods.

Other filter cartridge structures are disclosed in U.S. Pat. Nos. 3,165,471; 4,,094,793; 1,102,685; 1,742,919; 2,411,341; 3,178,028; and 4,048,073.

SUMMARY OF THE INVENTION

Accordingly, a principal object of the invention is to provide support for the filter cells of a filter cartridge to prevent distortion, collapse or swelling of filter cells or breakage of filter media when the cartridge is used to filter fluids or even handling.

A further object is to provide such support while enhancing the radial flow between the cells of fluid to be filtered.

According to embodiments of the invention, these objects may be achieved by providing an external separator between each pair of cells. The external separator prevents the filter media of adjacent cells from touching and restricting flow from the periphery to the center of the cartridge. It also reduces sagging and breakage of the cells or cell media. It advantageously may incorporate prominent radial ribs to enhance the radial flow between the cells of fluid to be filtered. Advantageously, the external separator is incorporated into the seal ring between the cells to reduce the number of parts required.

According to preferred embodiments of the invention, a filter cartridge comprises (a) elongated fluid-conducting core means; (b) a plurality of filter cells mounted generally parallel to and spaced from one another and radially about the core means, each cell having an exterior and an interior, the exterior communicating with the interior through a filter medium for filtering fluids which pass from the exterior to the interior of the filter cell, and the interior of the filter cell being in fluid communication with the core means; and (c) at least one external filter cell separator mounted radially about the core means between two adjacent filter cells and generally parallel thereto, and coacting with the cells to maintain the separation therebetween.

The separators advantageously define generally outwardly concave surfaces on their upper and lower sides, which correspond to the generally outwardly convex surfaces of the filter cells. Each separator includes a generally flat, disc-shaped separator body and upstanding spacer means on both faces thereof, the spacer means having varying length so as to provide the above-mentioned generally concave surface. The spacer means may include radial ribs which stand out from the separator body and provide channels for permitting radial flow of fluid to be filtered. Alternatively, the spacer means may include coaxial separator rings which stand out from the separator body, and preferably, provide similar channels to permit radial fluid flow in portions of the separator rings.

BRIEF DESCRIPTION OF THE DRAWINGS

Other objects, features and advantages of the invention will be seen in the following detailed description of preferred embodiments, with reference to the accompanying drawings, in which.

DETAILED DESCRIPTION OF THE PREFERRED EMBODIMENTS

Figure 1:
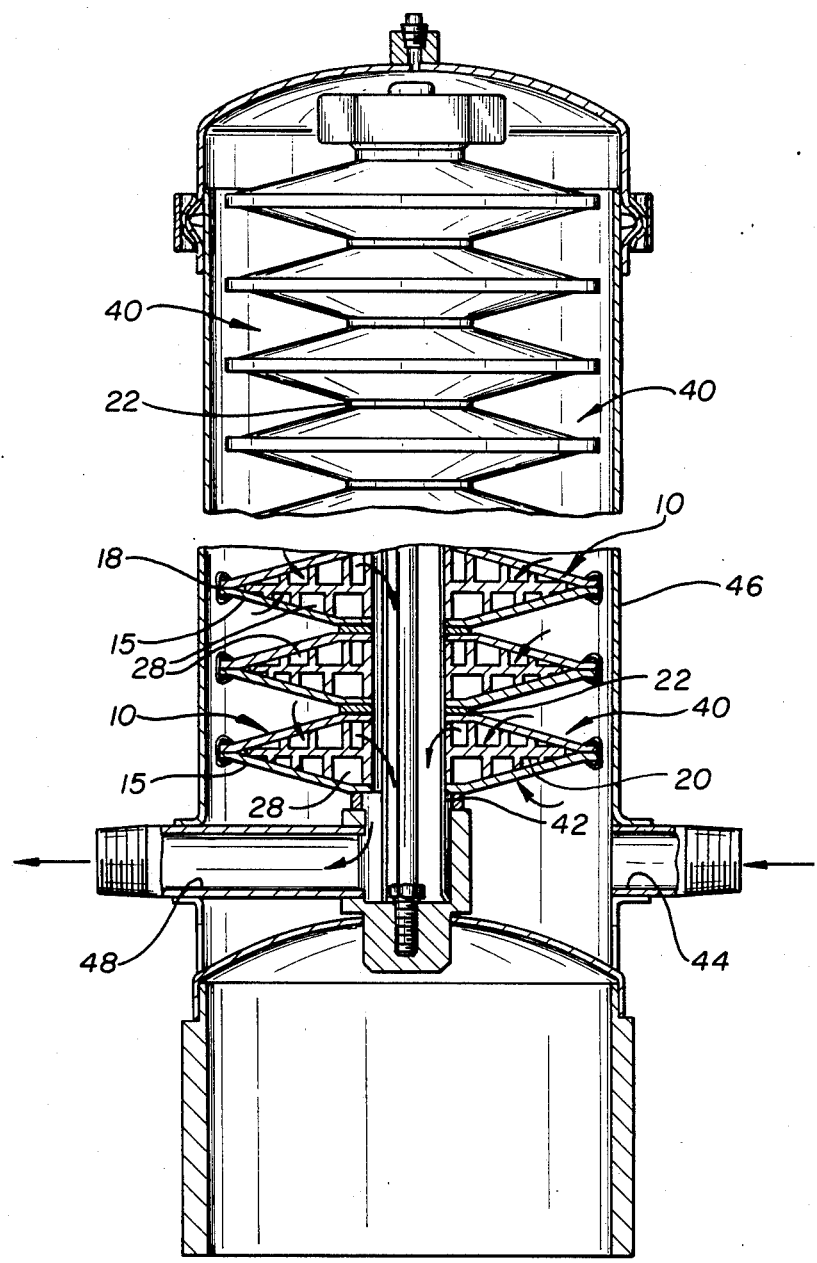
FIG. 1 is an elevation, partially in cross-section, of a prior art filter cartridge, including a plurality of filter cells and enclosed in a housing, with which the external cell separators of the present invention may be employed.
Figure 2:
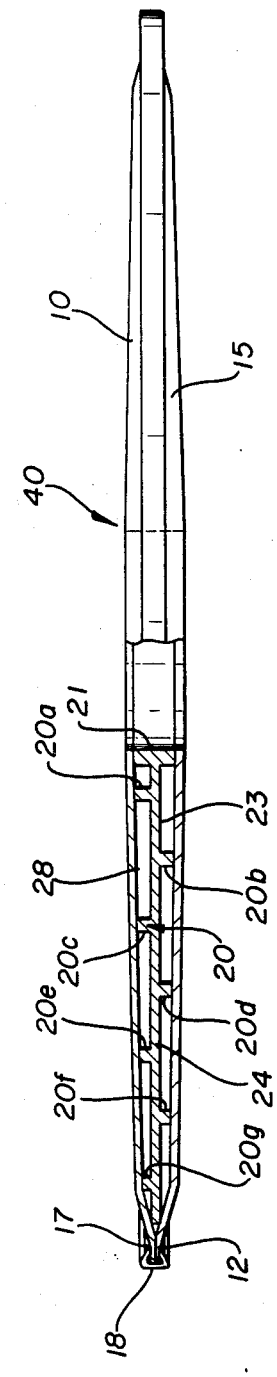
FIG. 2 is a cross-section of an individual filter cell within the filter cartridge of FIG. 1.

FIGS. 1 and 2 depict, respectively, a filter cartridge and housing, and a filter cell, with which the external filter cell separators according to the invention may be used. Referring to FIGS. 1 and 2, the preferred filter cell 40 includes two filter media 10 and 15. Preferably, the media is a nonmetallic, fibrous-containing media, e.g. cellulose, in the form of discs having a dished shape with peripheral flanges 12 and 17 in intimate face-to-face contact with each other and sealed together by a molded edge seal 18. The filter media 10 and 15 of each cell are separated by an internal spacer 20, the media and the spacer having corresponding central axial openings which together form a central aperture 21, such that the respective openings of a plurality of cells form a vertical conduit 42.

As seen in FIG. 2, the internal spacer 20 has a plurality of coaxial, generally circular ribs 20a, 20b, etc., which project above and below a generally planar spacer body 24. Although seven ribs are shown, a different number could be selected. The ribs near the central opening 21, for example rib 20a, have a greater height above the spacer body 24 than the ribs toward the periphery, for example rib 20g. This gradient in the rib height is consistent with the dished, outwardly convex shape of the filter media 10 and 15 which constitute the top and bottom surfaces of the filter cell 40. Although not shown, the spacer 20 preferably has radial channels formed in several distributed portions of its surface, including channels communicating the space 28 with the conduit 42, to permit passage of filtered fluid from outer portions to inner portions of the filter cell.

A method of making a filter cell similar to the preceding is described in U.S. Pat. No. 4,347,208 to Kenneth Southall. The entire disclosure of this patent is incorporated herein by reference.

In operation, fluid is filtered by passing through intake pipe 44 into a housing 46. The fluid passes from the outside of each filter cell 40 through the filter media 10 and 15 to the space 28 within each cell formed by the spacer means 20. Contaminants, e.g. insolubles and microorganisms, are deposited on the outside and/or within the filter media 10 and 15, and the filtrate is discharged through a discharge tube 48. Discharge tube 48 is in fluid connection with vertical conduit 42 which is in fluid connection with space 28 between the media 10 and 15.

Also seen between each pair of filter cells 40 in FIG. 1 is a seal ring 22, which is an annular body with a central axial opening which correspond to the central aperture 21 of each filter cell and forms part of the vertical conduit 42.

Figure 3:
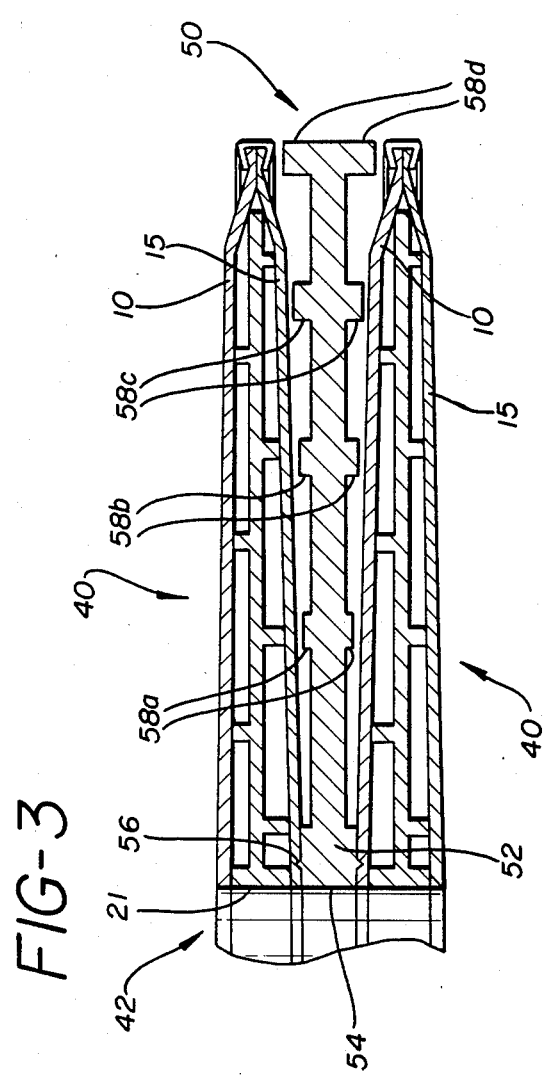
FIG. 3 is a partial cross-sectional view showing two filter cells and installed therebetween an intermediate external cell separator according to an embodiment of the invention.

FIG. 3 is a partial cross-sectional view showing two filter cells 40. Mounted between them about the vertical conduit 42 is one embodiment of an external filter cell separator 50 according to the invention. A central annular seal ring 52, which is an annular body with a central axial opening 54 corresponding to the central apertures 21 of the filter cells, forms part of the vertical conduit 42. The seal ring may have projections 56 for engaging the filter media 10 and 15 for a secure grip. The projections 56 may be, for example, discrete points or bosses, or coaxial ribs having varying radii.

Extending radially outward from the seal ring 54 is a generally planar separator body 58 which extends between the pair of filter cells 40 from the seal ring substantially to the filter cell peripheries. Formed on the upper and lower surfaces of the body 58 are pairs of non-continuous coaxial separator rings 58a, 58b, 58c, and 58d. The rings toward the center, for example 58a, preferably do not extend as far toward the filter cells as the more peripheral rings, for example 58d. The rings may also be a series of contact points. They are non-continuous to enable the fluid to flow radially therethrough. The gradient in ring thickness generally matches the curvature of the filter media 10 and 15 to provide good support for the media if even a small amount of distortion of the media occurs.

Figure 4:
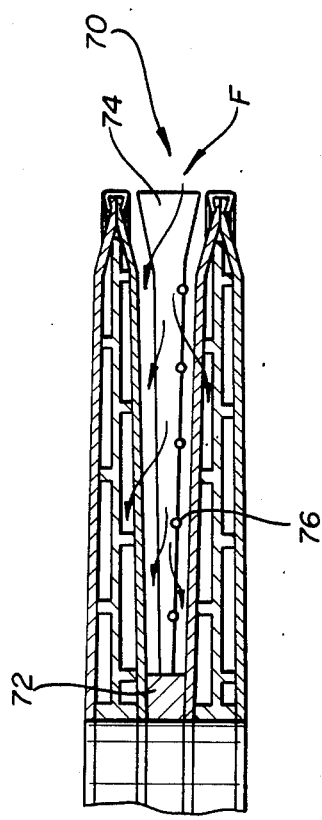
FIG. 4 is a partial cross-sectional view similar to FIG. 3 showing an external filter cell separator according to an alternate embodiment of the invention.

FIG. 4 shows an alternate embodiment of an external filter cell spearator 70 according to the invention. In this embodiment, a seal ring 72 has mounted thereon a plurality of radial separator ribs 74 which extend radially outward from the seal ring with increasing vertical thickness. Thus, surfaces defined by the upper and lower extremities of the ribs 74 are roughly parallel to the adjacent surfaces of the filter media 15 and 20. The ribs 74 are reinforced by coaxial rings 76 formed on the ribs by a molding process or the like. The rings 76 preferably do not extend across the entire thickness of the ribs, so as to provide a channel for radial flow of fluid to be filtered, as indicated by the arrows F in FIG. 4.

As described, the filter cartridges employing external cell separators according to the above-described embodiments of the invention accomplish the objects stated above, namely coacting with and supporting adjacent filter cells against swelling, distortion and/or damage due to filtration of fluids and handling, without obstructing the radial fluid flow that is part of the normal operation of this type of filter cartridge.

This results in increased use of effective filter area, prolonging life of the filter, reduced flow restriction, greater contaminant loading capability, and greater durability of construction.

For example, two 16-cell filter cartridges (ZETA-PLUS 45115-12-50S) were used to filter a carbon black aqueous slurry. One cartridge was the commercially available product, i.e. one having no separators between cells. The other cartridge was a modified commercially available cartridge having separators between the cells according to the invention. The slurry was filtered and the cartridges disassembled. It was found that the cartridge having the separators therein, as noted by the color of the filter, had utilized essentially all of the effective filtering area; whereas the cartridge without the separators only utilized about 40% to 80% of the effective surface area. Results similar to these have also been confirmed by field tests.

Although illustrative embodiments have been described herein, with reference to the drawings, it is to be understood that the invention is not limited to the disclosed embodiments. For example, alternate forms of the external filter cell separator may occur to those skilled in the art which incorporate various features from the plastics and fluid filtration arts, while still appropriating the inventive features disclosed herein. Such forms are still to be considered within the scope of the invention, as defined by the following claims.

What is claimed is:

1. A filter cartridge comprising:
   (a) an elongated fluid-conducting core means;
   (b) a plurality of filter cells mounted generally parallel to and spaced from one another and radially about the core means, each filter cell having an exterior, the exterior communicating with the interior through a filter medium for filtering fluids which pass from the exterior to the interior of the filter cell, and the interior of the filter cell being in fluid communication with the core means;
   (c) at least one filter cell separator mounted radially about the core means between two adjacent filter cells and generally parallel thereto;
   (d) said filter cell separator comprising:
      a continuous web;
      a plurality of rings extending from one side of said continuous web, said rings being in spaced relation with each other;
      a plurality of radial ribs extending radially from the inner portion of said web to the outer portion;
      said rings coacting with the adjacent filter cell to position said filter cell separator relative to the adjacent filter cell; and
      said ribs coacting to form radial fluid pathways for liquid across the external surfaces of said adjacent filter cell.

2. A filter cartridge comprising:
   (a) an elongated fluid-conducting core means;
   (b) a plurality of filter cells mounted generally parallel to and spaced from one another and radially about the core means, each filter cell having an exterior, the exterior communicating with the interior through a filter medium for filtering fluids which pass from the exterior to the interior of the filter cell, and the interior of the filter cell being in fluid communication with the core means;
   (c) at least one filter cell separator mounted radially about the core means between two adjacent filter cells and generally parallel thereto;
   (d) said filter cell separator comprising:
      a continuous web;
      a plurality of rings extending from one side of said continuous web, said rings being in spaced relation with each other;
      a plurality of radial ribs extending radially from the inner portion of said web to the outer portion;
      said ribs coacting to form radial fluid pathways for liquid across the external surfaces of said adjacent filter cell;
      said rings coacting with said ribs to mutually position each other; and
      said rings coacting with said radial fluid pathways to disperse fluid along said radial fluid pathways.

3. A filter cartridge as in claim 1 or 2, wherein:
   (a) said web has a generally flat, disc-shaped separator body;
   (b) said filter cell separator includes means for mounting said separator body about the core means; and
   (c) said plurality of ribs and rings are on at least one face of said separator body having distal ends at a distance from said separator body being generally a positive function of the distance of said plurality of ribs and rings from the core means.

4. A filter cartridge as in claim 3, wherein said plurality of ribs and rings are on both faces of said disc-shaped separator body.

5. A filter cartridge as in claim 4 wherein said plurality of rings are coaxial and upstanding.

6. A filter cartridge as in claim 5, wherein portions of said plurality of rings define channels for permitting radial flow of fluids to be filtered.

7. A filter cartridge as in claim 3, wherein said distal ends of said plurality of ribs and rings define a surface which is generally outwardly concave with respect to said separator body.

8. A filter cartridge as in claims 1 or 2, wherein each said filter cell defines a generally outwardly convex surface in a given direction parallel to said core means, and said filter separator defines a generally outwardly concave surface opposed to said filter cell surface, said convex and concave surfaces being closely adjacent one another so as to prevent any excessive displacement of said filter cell in said given direction.

9. A filter cartridge as in claims 1 or 2, wherein one said filter separator is mounted between each pair of adjacent filter cells of said filter cartridge.

* * * * *